Sept. 17, 1957      B. D. BROWN      2,806,716

SINGLE BREAK AWAY HOSE ATTACHED COUPLER

Filed Aug. 2, 1954

Billy D. Brown
INVENTOR.

United States Patent Office 2,806,716
Patented Sept. 17, 1957

2,806,716

SINGLE BREAK AWAY HOSE ATTACHED COUPLER

Billy D. Brown, Bondurant, Iowa

Application August 2, 1954, Serial No. 447,091

2 Claims. (Cl. 285—1)

This invention relates to an attachment for the hydraulic coupling arrangement such as is normally employed on tractors and like agricultural equipment and more particularly to a device for actuating a conventional coupler when excessive strain is applied thereon.

The primary object of the present invention resides in the provision of a device for use in combination with a hydraulic coupler which is adapted to actuate the sleeve of the socket of the coupler when the hydraulic hose is subject to excessive tension which might otherwise break the hose or the seal and which employs novel means for enabling the device to be uncoupled manually when such is desired.

Still further objects and features of this invention reside in the provision of a break away coupler that is simple in construction, easy to install, and highly efficient in operation.

These, together with the various ancillary objects and features of the invention which will become apparent as the following description proceeds, are attained by this break away coupler, a preferred embodiment of which has been illustrated in the accompanying drawings, by way of example only, wherein.

Figure 1:
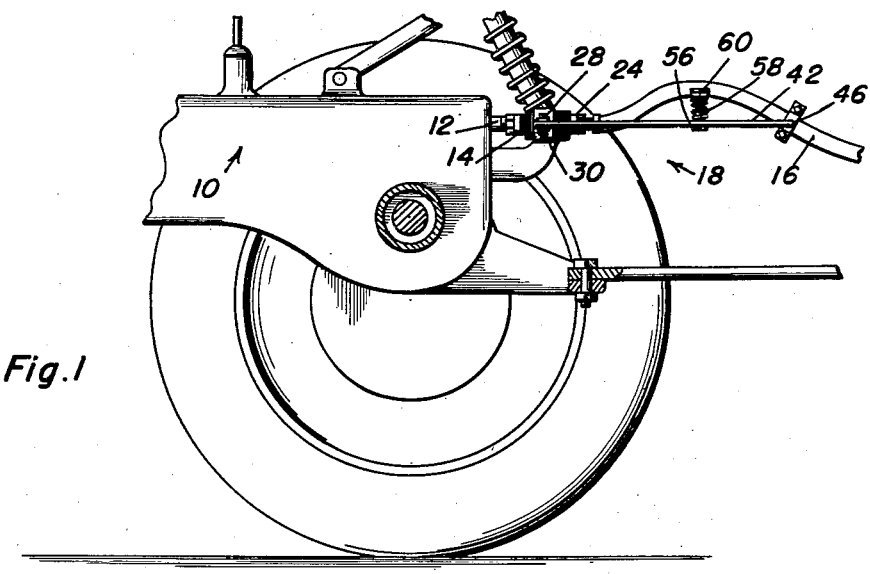
Figure 1 is a side elevational view showing the invention as operatively installed in association with the hydraulic system of a conventional tractor.
Figure 2:
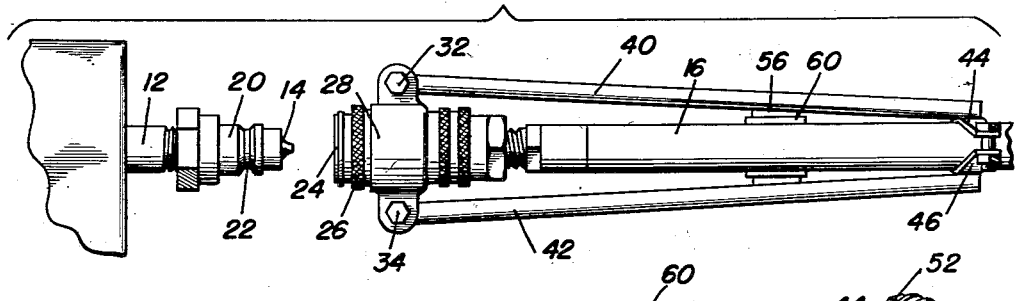
Figure 2 is an exploded view illustrating the manner in which the break away coupler is associated with the socket and plug of the hydraulic coupler.
Figure 3:
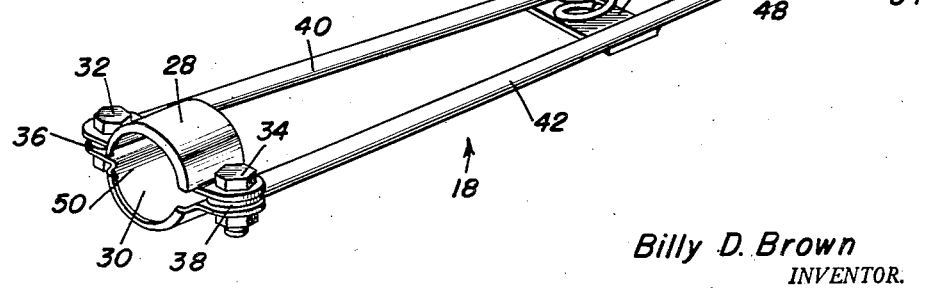
Figure 3 is a perspective view of the break away coupler.

With continuing reference to the accompanying drawings wherein like reference numerals designate similar parts throughout the various views, reference numeral 10 generally designates a portion of a conventional farm tractor having a hydraulic system which includes a supply conduit 12. Connected to the supply conduit by a hydraulic coupler 14 is a hydraulic hose 16. In order to provide means for releasably mounting the hydraulic coupler 14 there is provided the break away coupler indicated at 18 and comprising the main elements of this invention.

The hydraulic coupler 14 is of the conventional construction and is provided with a plug 20 which is threadedly detachably secured to the supply fitting 12 and which has a peripheral groove 22 therein for reception of the pawl detents, not shown, of the socket 24 comprising the other portion of the hydraulic coupler 14. Actuating the pawl detents, not shown, is a sleeve 26 which is slidably mounted thereon. Hence, when the sleeve 26 is in a locking position, the pawl detents are held in the groove 22 but when the sleeve 26 is moved with respect to the socket 24 out of the locking position, the pawl detents may be pulled out of the groove 22, thus permitting disengagement of the plug 20 from the socket 24. The hydraulic hose 16 is attached to the socket 24 and is thence connected to the appliance to be activated by the hydraulic system.

The break away coupler 18 includes a first clamp arrangement which includes arcuate clamp members 28 and 30 which are joined together by bolts 32 and 34 through the flanged ends thereof and which retain therebetween the eye members 36 and 38 of a pair of rods 40 and 42. The clamp members 28 and 30 are adapted to be clampingly received over the sleeve 26.

Welded to the other ends of the rods 40 and 42 are clamp members 44 and 46 which are adapted to be clampingly received over the hydraulic hose 46. These clamp members 44 and 46 are arranged so that the opening 48 therethrough extends at an acute angle relative to the opening 50 between the clamp members 28 and 30.

A pair of bolts 52 and 54 extend through the flange portions of the clamp members 44 and 46 to lockingly hold the clamp members 44 and 46 on the hydraulic hose 16.

Welded or otherwise secured to and extending between the rods 40 and 42 is a support plate 56 to which one end of a coil spring 58 is secured. The other end of the coil spring is attached to the undersurface of an upwardly concaved hose mounting plate 60. The hose mounting plate 60 is adapted to receive the hydraulic hose 16 therein.

The operation of this invention is quite simple. With the hydraulic hose 16 connected to the implement which is adapted to be operated by the hydraulic system, if too great a strain were to be applied upon the hydraulic hose 16, it would pull upon the sleeve 26 of the break away coupler 18 which would cause the sleeve 26 to slide relative to the socket 24 thus detaching the plug 20 from the socket 24 and hence preventing the breaking of the hose 16 or other parts of the connecting apparatus. It is recognized that in order to detach the socket 24 from the plug 20 it is necessary to move the sleeve relative to the socket. Further, if it is desired to release the coupler 14 manually, it is merely necessary to apply pressure on the hose 16 immediately above the mounting plate 60 which would then cause the socket 24 to slide inwardly of the sleeve 26 thus releasing the plug 20 since the pressure will cause the angular relationship between the hose 16 and rods 40 and 42 to change, thus forcing the movable socket member to move.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a hydraulic coupler having a socket to which a hydraulic hose is attached and a plug fitting lockingly engaged by said socket, a break away coupler including first clamp means secured about said socket, other clamp means secured about said hose, a pair of rods terminally attached to said first clamp means and said other clamp means, a support plate secured to said rods and extending therebetween, a concave hose receiving plate, a coil spring terminally attached to said support plate and said hose receiving plate to urge said hose receiving plate away from said rods, said hose resting on said hose receiving plate.

2. In combination with a hydraulic coupler having a socket to which a hydraulic hose is attached and a plug fitting lockingly engaged by said socket, a break away coupler including first clamp means secured about said socket, other clamp means secured about said hose, a pair of rods terminally attached to said first clamp means and said other clamp means, a support plate secured to said rods and extending therebetween, a concave hose receiving plate, a coil spring terminally attached to said support plate and said hose receiving plate to urge said hose receiving plate away from said rods, said hose resting on said hose receiving plate, the axis of said other clamp means extending at an acute angle with respect to said first clamp means.

References Cited in the file of this patent

UNITED STATES PATENTS

| | | |
|---|---|---|
| 152,413 | Rhinehart | June 23, 1874 |
| 2,034,558 | Bronson | Mar. 17, 1936 |
| 2,170,557 | Guarneschelli | Aug. 22, 1939 |